UNITED STATES PATENT OFFICE.

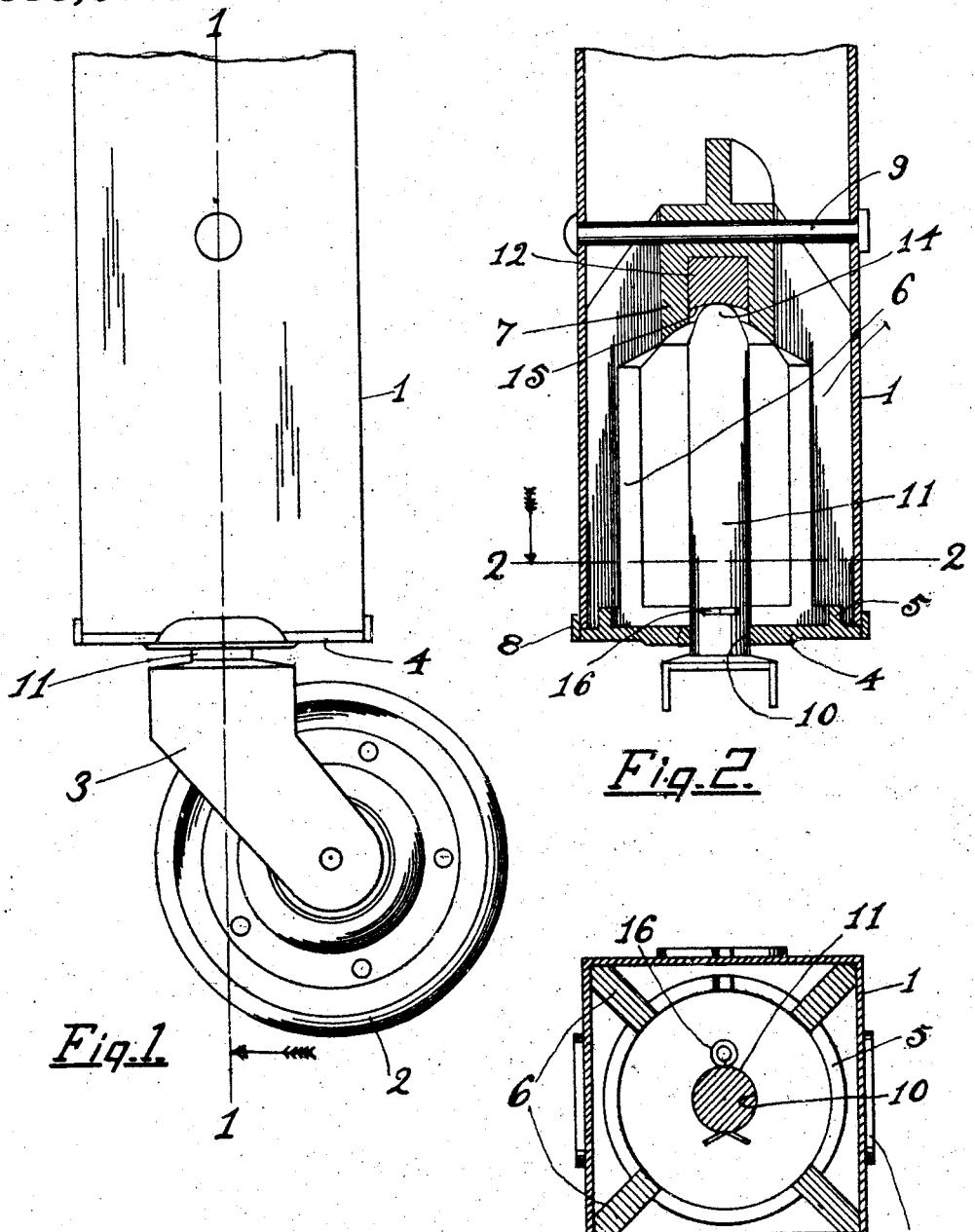

LANVILLE A. BROWN, OF KANSAS CITY, MISSOURI.

LEG-MOUNT BUSHING FOR BEDSTEADS.

1,333,604.  Specification of Letters Patent.  Patented Mar. 16, 1920.

Application filed April 4, 1918. Serial No. 226,597.

*To all whom it may concern:*

Be it known that I, LANVILLE A. BROWN, a citizen of the United States, residing at Kansas City, in the county of Jackson and State of Missouri, have invented certain new and useful Improvements in Leg-Mount Bushings for Bedsteads, of which the following is a full, clear, and exact description, such as will enable others skilled in the art to which it appertains to make and use the same.

The invention relates to leg mounts for bedsteads and seeks to provide a simple and efficient form of leg mount bushing with an improved pintle point bearing a positive set, and means to positively retain the caster shank in the bushing.

The pintle point bearing is not new but heretofore the construction of pintle point bearings has been such that the caster shank would not turn easily in the leg mount bushing and the means that has been provided to retain the caster shank in the bushing has not performed that function excepting for a short time while the bushing was new.

It is essential that a pintle point bearing be provided that will allow the caster shank to turn in the leg mount bushing with no friction and that a positive set be provided together with means to retain the shank in the bushing.

The present invention seeks to provide an improved leg mount bushing and caster shank for bedsteads that will remove all friction that would tend to retard or resist the rotation of the caster shank in the bushing together with a positive set and means to always retain the caster shank in the bushing.

With these and other objects in view the invention consists in the features of construction, combination and arrangements of parts hereinafter set forth and more particularly pointed out in the appended claims, the accompanying drawings illustrating a form of the invention.

In the drawings:

Figure 1 is a fragmentary view in elevation of a bedstead leg to which the improved leg mount bushing, pintle point bearing and positive set, and shank retainer are applied, the caster wheel shown, being of common and well known construction.

Fig. 2 is a vertical sectional view taken on line 1—1 of Fig. 1, with the caster wheel omitted.

Fig. 3 is a horizontal sectional view taken on line 2—2 of Fig. 2, with the caster wheel omitted.

The bedstead leg 1, caster wheel 2 and bifurcated caster wheel jaw 3 are of common and well known construction.

The leg mount bushing comprises the flat base portion 4, the annular flange 5 rising therefrom, the rib shaped integral connecting bars 6, the boss portion 7 and the positive set lips 8.

The bedstead leg 1 rests upon the base portion 4 between the positive set lips 8 and is held in rigid position thereby, the bolt 9 passing through the leg 1 and through the boss portion 7 retaining the leg rigidly on the base portion 4 between the lips 8.

The hole 10 is provided in the base portion 4 for the insertion of the caster shank 11, the shank being slightly smaller than the hole so there will be no friction from the shank turning in the base portion of the bushing.

In the boss portion 7 of the leg mount bushing is inserted the bearing 12 preferably of chilled cast iron, because it is believed that chilled cast iron offers less resistance to hardened steel than other metals. The shank 11, is preferably of hardened steel and the end 14 thereof is of conical shape fitting loosely in the cupped face 15 of the bearing 12.

It has been found in practice that the hardened steel shank of conical shape resting in the cupped bearing 12 offers no perceptible resistance and the caster shank turns very freely under the weight of the bedstead.

In the shank 11 and above the base portion 4 is inserted the cotter pin 16 which allows the caster shank to drop slightly away from the bearing 12 when the bedstead leg is lifted but not sufficiently to allow the end 14 of the shank to become removed from the cupped portion of the bearing 12 and the boss 7, the bearing being inserted into the boss sufficiently to allow the shank to always remain within the boss by reason of the limit of vertical movement provided by the cotter pin 16.

From the foregoing it will be understood that the shank 11 will always turn freely under a load, the cotter pin will positively retain the shank in place and the leg is positively set within the lips 8 of the leg mount bushing.

What I claim as new and desire to secure by Letters Patent, is:—

1. In a leg mount bushing for caster shanks, a flat base portion, retainer lips integral with said base portion to positively set a bedstead leg, integral connecting bars rising from said base portion, a boss integral with the upper end of said connecting bars, a chilled cast iron cup shaped bearing in said boss, a hole in said boss portion, a caster shank in said hole and bearing on said chilled bearing, and a cotter pin in said shank above said base portion.

2. A leg mount bushing for caster shanks comprising, a flat base portion, integral bars rising from said base portion, a boss integral with said bars, a hole in said boss and an antifriction bearing in said hole, and a hole in said base to receive a caster shank.

LANVILLE A. BROWN.